(12) United States Patent
Hama et al.

(10) Patent No.: US 6,392,772 B1
(45) Date of Patent: May 21, 2002

(54) MULTI-BEAM SCANNING OPTICAL SYSTEM

(75) Inventors: Yoshihiro Hama; Yasushi Suzuki; Taminori Odano, all of Saitama-ken; Susumu Mikajiri, Chiba-ken, all of (JP)

(73) Assignee: Ashai Kogaku Kogyo Kabushiki Kaisha, Tokyo (JP)

( * ) Notice: Subject to any disclaimer, the term of this patent is extended or adjusted under 35 U.S.C. 154(b) by 29 days.

(21) Appl. No.: 09/699,357

(22) Filed: Oct. 31, 2000

(30) Foreign Application Priority Data

Jan. 11, 1999 (JP) .......................... 11-310533

(51) Int. Cl.[7] .............................. G02B 26/08
(52) U.S. Cl. .................. 359/204; 359/205; 359/206; 359/216
(58) Field of Search .............. 359/204–207, 359/216–219, 662, 17, 19, 563, 568–570, 574; 347/241–244

(56) References Cited

U.S. PATENT DOCUMENTS

| 4,937,664 A | 6/1990 | Chiku et al. |
| 4,962,983 A | 10/1990 | Watanabe |
| 5,181,137 A | 1/1993 | Koide |
| 5,694,251 A | * 12/1997 | Shimada et al. ............ 359/206 |
| 5,784,094 A | 7/1998 | Ota et al. |
| 5,796,520 A | 8/1998 | Maruyama |
| 5,841,566 A | 11/1998 | Minakuchi et al. |
| 6,115,164 A | 9/2000 | Kamikubo |
| 6,124,962 A | 9/2000 | Kamikubo |

FOREIGN PATENT DOCUMENTS

| JP | 01142674 | 6/1989 |
| JP | 01164917 | 6/1989 |
| JP | 02058015 | 2/1990 |
| JP | 06160743 | 6/1994 |
| JP | 09005656 | 1/1997 |
| JP | 10133131 | 5/1998 |

\* cited by examiner

*Primary Examiner*—James Phan
(74) *Attorney, Agent, or Firm*—Greenblum & Bernstein, P.L.C.

(57) ABSTRACT

A multi-beam scanning optical system is provided with a light source unit, polygonal mirror, and an fθ lens. The fθ lens includes a first lens that converges the beams mainly in the main scanning direction, and a second lens that converges the beams mainly in the auxiliary scanning direction. The first and second lenses are made of different materials. Further, one of the first and second lenses is formed integrally with the other using a mold such that the first and second lenses constitute a composite lens unit.

14 Claims, 6 Drawing Sheets

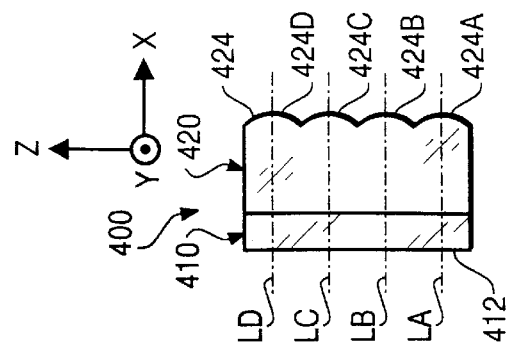
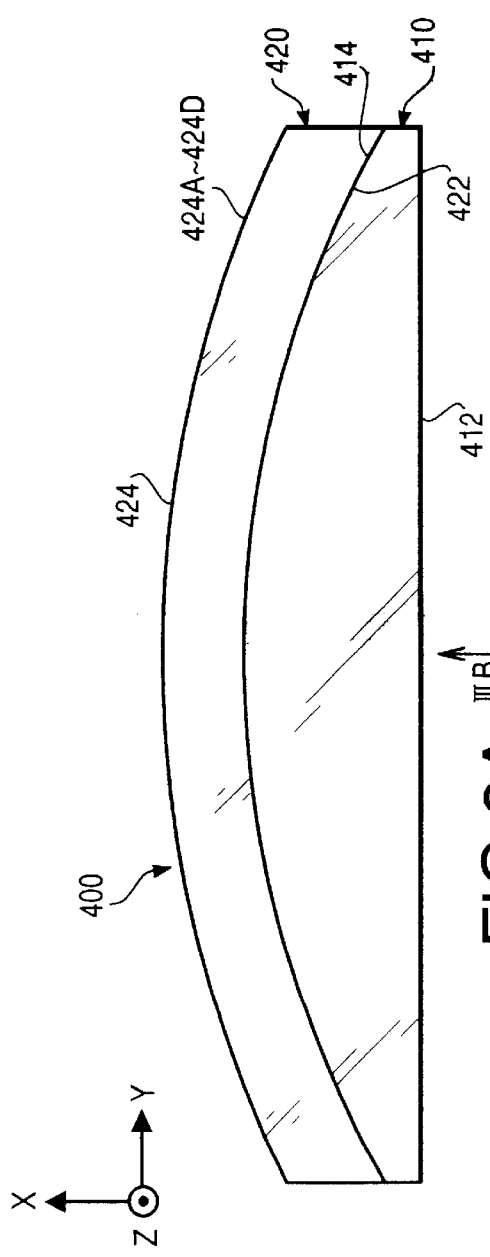
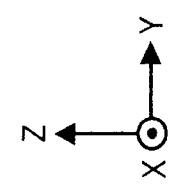
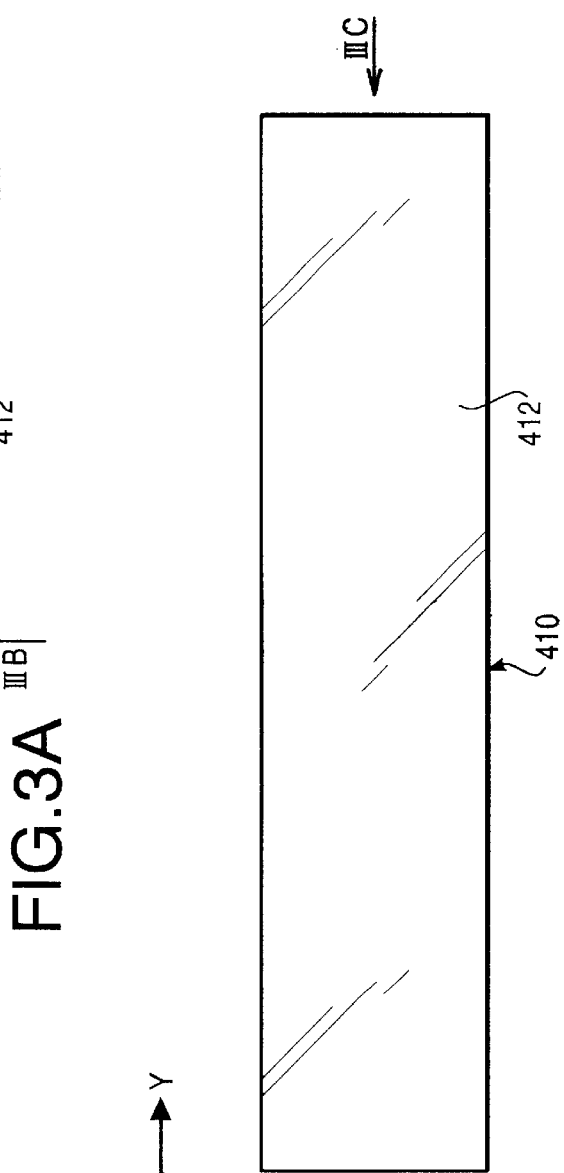

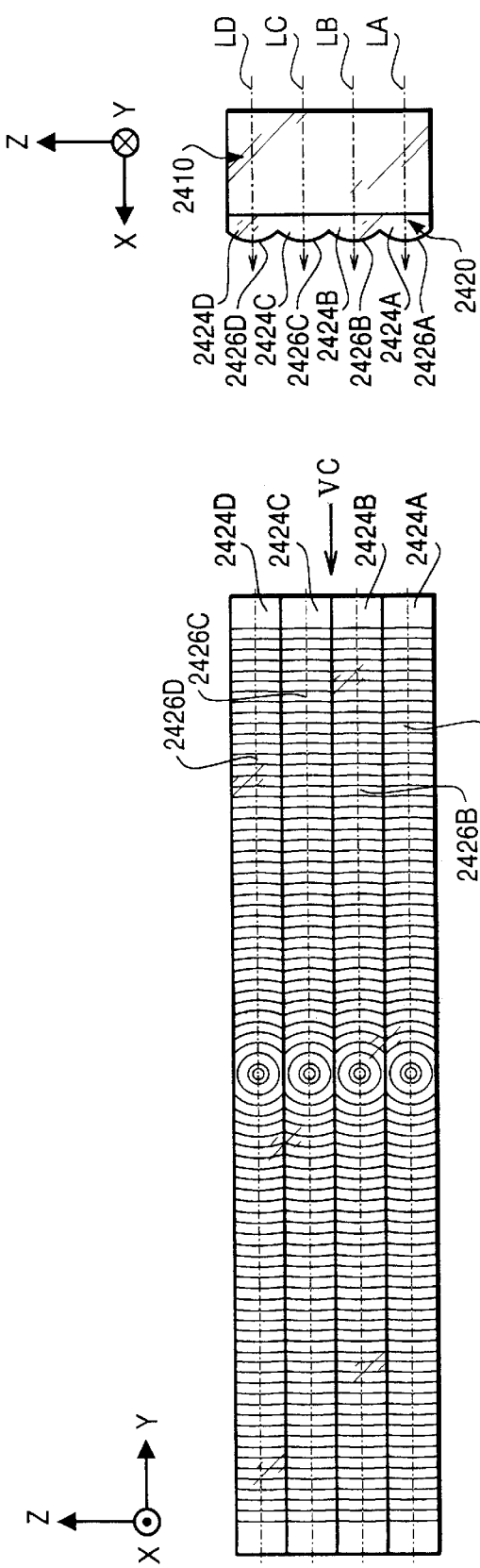
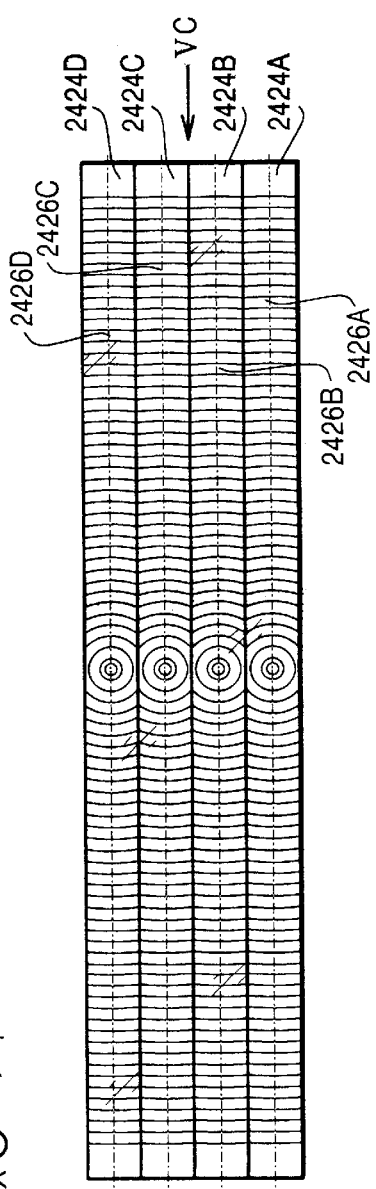
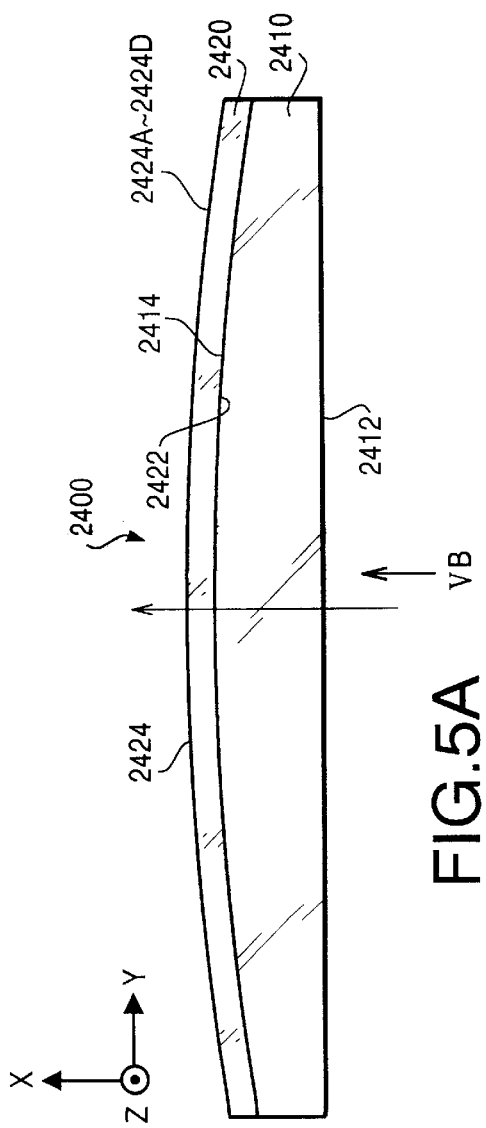
FIG. 5C
FIG. 5B
FIG. 5A

MULTI-BEAM SCANNING OPTICAL SYSTEM

BACKGROUND OF THE INVENTION

The present invention relates to a multi-beam scanning optical system in which a plurality of light beams emitted by a plurality of light sources are deflected to scan on a surface to be scanned such as a circumferential surface of a photoconductive drum.

A scanning optical system to be employed in a laser printer for forming a monochrome (e.g., a black-and-white) image is provided with a laser diode, which is driven in accordance with image data. The laser beam emitted by the laser diode is collimated by a collimating lens, and is directed to a deflecting member such as a polygonal mirror. The laser beam, which is incident on light reflecting surfaces of the rotating polygonal mirror, is deflected to scan within a predetermined angular range. The scanning laser beam is incident on an fθ lens, refracted and converged thereby, and then is incident on an evenly charged photoconductive surface of a photoconductive drum to form a beam spot which moves along the rotational axis of the photoconductive drum (i.e., along a main scanning direction). Since the laser diode is driven in accordance with the image data, the surface of the photoconductive drum is exposed to light corresponding to the image data. While the light beam scans on the surface of the photoconductive drum, it is rotated (i.e., an auxiliary scanning is performed). Thus, a two-dimensional latent image is formed on the photoconductive surface of the photoconductive drum.

Then, toner is applied to the latent image to form a developed image, which is transferred onto a recording sheet and fixed thereon.

Recently, color laser beam printers, which are capable of forming color images, have been developed. In the color laser printer, generally, a plurality of laser diodes are provided (which will be referred to as a multi-beam laser printer). Further, the corresponding number of fθ lenses, and the corresponding number of photoconductive drums are provided for forming images of respective color components (e.g., yellow, magenta, cyan and black components). The above-described, exposing and developing processes are performed for each color component, and thus formed color images (developed image) for the four color components are transferred on a recording sheet and fixed.

In the multi-beam laser printer as described above, since a plurality of fθ lenses are employed for respective color components, the problems indicated below occur.

Firstly, various units such as an exposing unit, developing unit, and transferring unit, for performing an electrophotographic imaging process should be arranged around each photoconductive drum, and therefore a space for arranging such units should be provided. However, if the fθ lens includes a plurality of lenses, which occupy the space and it becomes difficult to maintain flexibility in designing the optical paths within the scanning optical device.

Further, since, in the conventional scanning optical system, the number of elements constituting the fθ lens is large, and therefore the manufacturing cost is raised.

SUMMARY OF THE INVENTION

In view of the above problems, an object of the present invention is to provide an improved scanning optical system in which the space occupied by the fθ lens is reduced to increase flexibility in designing the optical paths. Another object of the present invention is to provide an improved scanning optical system in which the number of elements is reduced to reduce the manufacturing cost thereof.

For the above objects, according to one aspect of the invention, there is provided a multi-beam scanning optical system, which is provided with a light source unit emitting a plurality of beams, the plurality of beams being parallel to each other, a polygonal mirror having a plurality of reflection surfaces arranged along a rotational direction of the polygonal mirror, the plurality of beams emitted by the light source unit being incident on the polygonal mirror and reflected by the reflection surfaces of the polygonal mirror, and an fθ lens system, the plurality of beams reflected by the reflection surface of the polygonal mirror passing through the fθ lens system and proceeding toward surfaces to be scanned. In the above structure, the fθ lens includes a first lens that converges the beams mainly in the main scanning direction, and a second lens that converges the beams mainly in the auxiliary scanning direction. The beams reflected by the polygonal mirror pass through the first and second lenses in this order. The first and second lenses are made of different materials, one of the first and second lenses being formed integrally with the other using a mold such that the first and second lenses form a composite lens.

Since the first and second lenses included in the fθ lens system are integrally formed as a composite lens unit, the space occupied by the fθ lens is reduced. Further, since the two lens elements are integrally formed to one element, the number of elements is also reduced.

Optionally, the second lens is provided with convex surfaces, on a light emerging surface of the second lens, extending in the main scanning direction and converging the beams in the auxiliary scanning direction.

Further optionally, diffraction lens structures can be provided on a light receiving surface of the first lens. In this case, the diffraction lens structure may be formed on a film adhered onto the light receiving surface of the first lens. Alternatively, the diffraction lens structure may be integrally formed on the light receiving surface of the first lens.

Alternatively, the diffraction lens structures can be provided on a light emerging surface of the second lens, the diffraction lens structures being formed on the convex surfaces, respectively.

Still optionally, the diffraction lens structures may be formed on the light receiving surface of said first lens at positions where the beams incident, respectively. Alternatively, diffraction lens structures may be formed on the light emerging surface of said second lens at positions where the beams incident, respectively.

According to another aspect of the invention, there is provided a multi-beam scanning optical system, which is provided with a light source unit emitting a plurality of beams, the plurality of beams being parallel to each other, a polygonal mirror having a plurality of reflection surfaces arranged along a rotational direction of the polygonal mirror, the plurality of beams emitted by the light source unit being incident on the polygonal mirror and reflected by the reflection surfaces of the polygonal mirror, and an fθ lens system, the plurality of beams reflected by the reflection surface of the polygonal mirror passing through the fθ lens system and proceeding toward surfaces to be scanned. In this case, the fθ lens may include a first lens that converges the beams mainly in the auxiliary scanning direction, and a second lens that converges the beams mainly in the main scanning direction. The beams reflected by the polygonal mirror pass through the first and second lenses in this order. Further, the first and second lenses are made of different materials, one of the first and second lenses being formed integrally with the other using a mold such that the first and second lenses constitute a composite lens.

Optionally, the first lens is provided with convex surfaces on a light receiving surface of the first lens, the convex surfaces extending in the main scanning direction and converging the beams in the auxiliary scanning direction.

Further optionally, diffraction lens structures are formed on the light receiving surface of the first lens at positions where the beams incident, respectively.

Alternatively, diffraction lens structures may be formed on the light emerging surface of the second lens at positions where the beams incident, respectively.

In one particular case, diffraction lens structures are provided on a light receiving surface of the first lens, the diffraction lens structures being formed on the convex surfaces, respectively.

In another particular case, diffraction lens structures are provided on a light emerging surface of the second lens. In this case, the diffraction lens structure may be formed on a film adhered onto the light emerging surface of the second lens. Alternatively, the diffraction lens structure may be integrally formed on the light emerging surface of the second lens.

DESCRIPTION OF THE ACCOMPANYING DRAWINGS

FIG. 3A is a plan view of a composite lens unit according to a first embodiment;

FIG. 3B is a front view of the composite lens unit, viewed along arrow IIIB in FIG. 3A;

FIG. 3C is a side view of the composite lens unit, viewed along arrow IIIC in FIG. 3B;

FIG. 5A is a plan view of a composite lens unit according to a third embodiment;

FIG. 5B is a front view of the composite lens unit, viewed along arrow VB in FIG. 5A;

FIG. 5C is a side view of the composite lens unit, viewed along arrow VC in FIG. 5B;

DESCRIPTION OF THE EMBODIMENT

Hereinafter, the invention will be described with reference to the accompanying drawings. It should be noted that in the embodiments described below, the multi-beam scanning optical system according to the invention is applied to a color printer for forming a color image in accordance with an electrophotographic imaging process.

Figure 1:
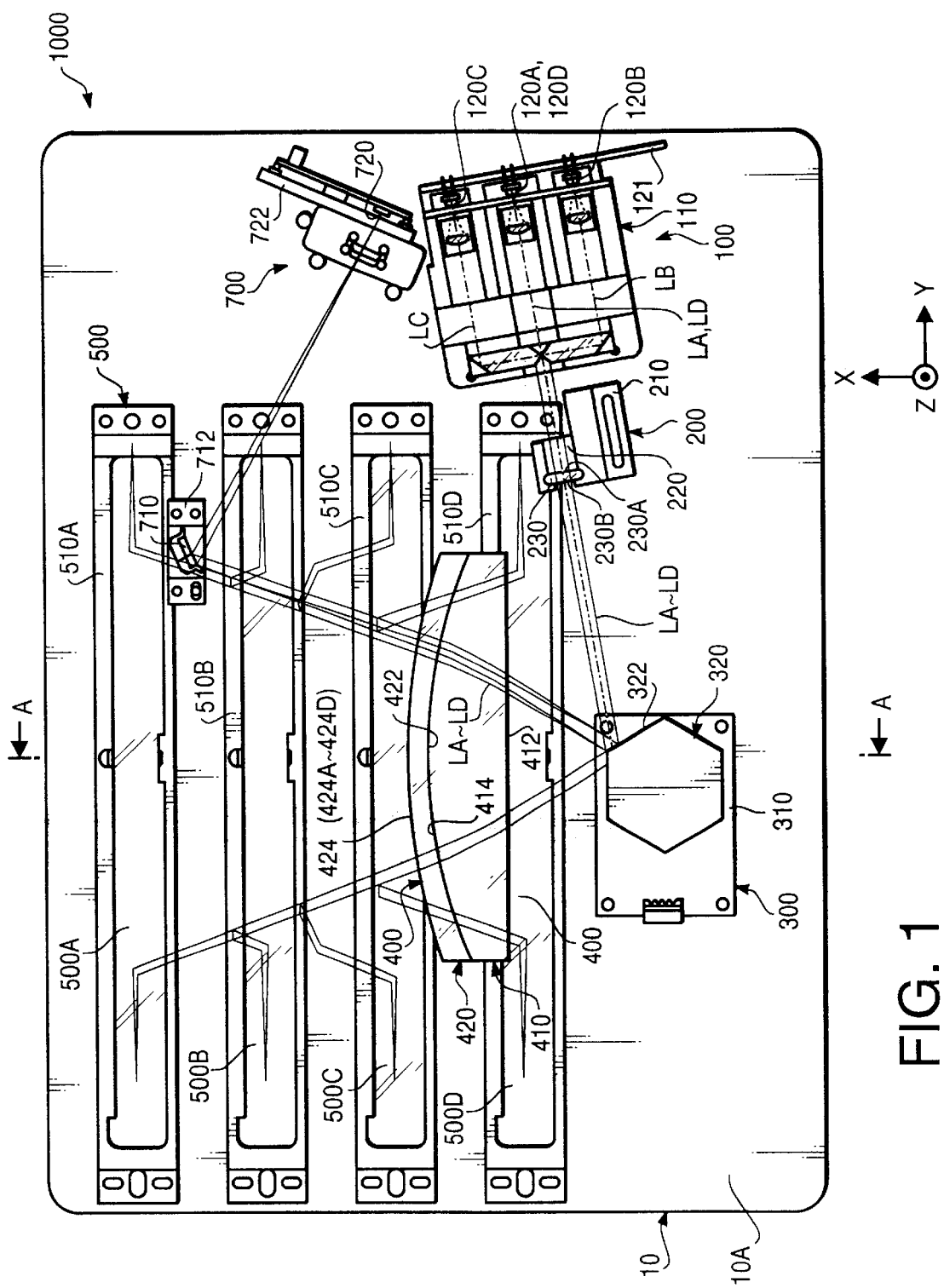
FIG. 1 is a plan view of a multi-beam scanning optical system according to a first embodiment of the present invention.
Figure 2:
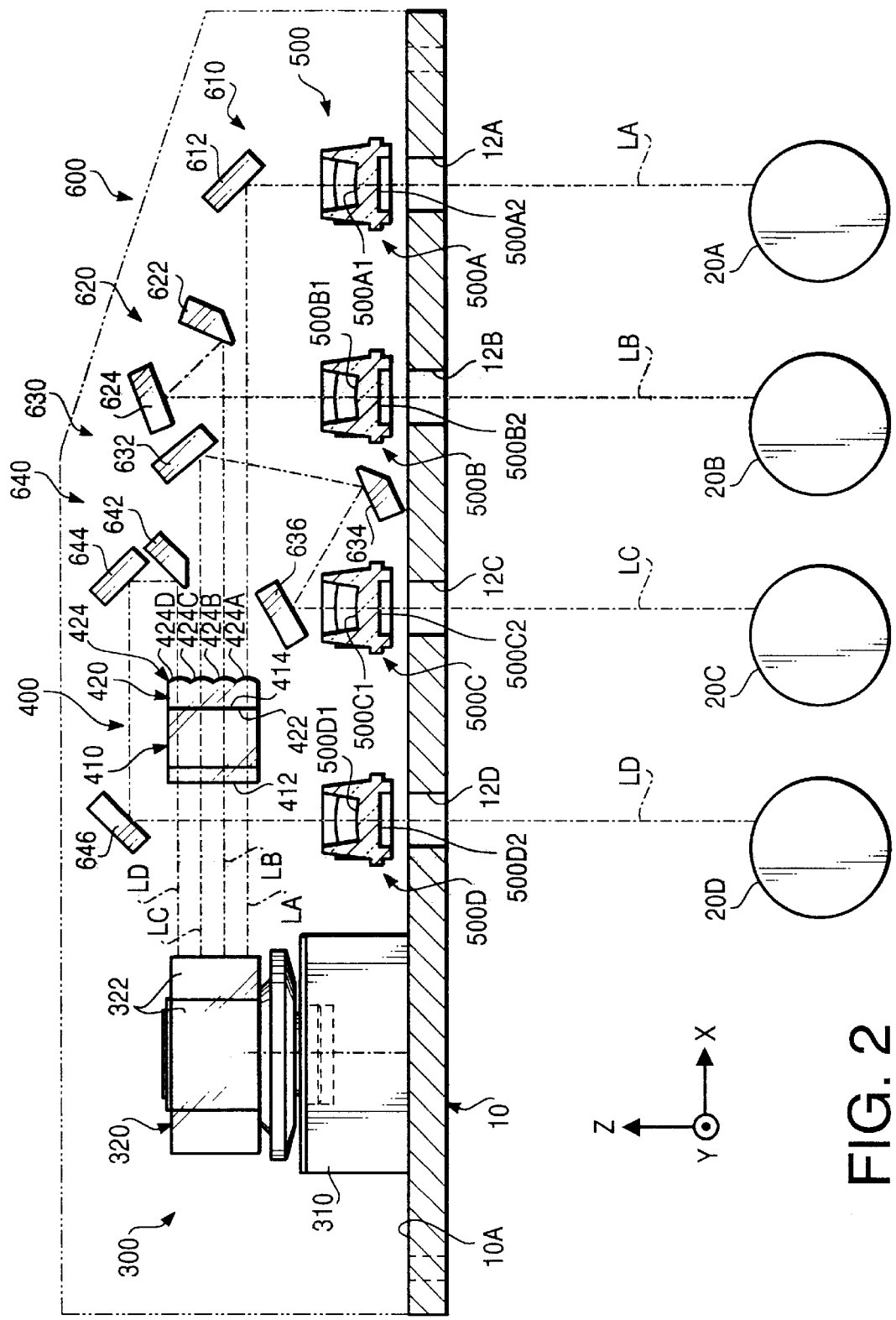
FIG. 2 is a cross sectional view of the multi-beam scanning optical system taken along line A—A in FIG. 1.

FIG. 1 is a plan view schematically showing a structure of a multi-beam scanning optical system 1000. FIG. 2 schematically shows a cross sectional view of the multi-beam scanning optical system 1000 taken along line A—A in FIG. 1.

The multi-beam scanning optical system 1000 includes a housing (not numbered) having a bottom plate 1o and an upper surface 10A. A plurality of elements (to be discussed below) are provided on the upper surface 10A. As shown in FIG. 1, the light source unit 100, a cylindrical lens unit 201, a polygonal mirror unit 300, a composite lens unit 400 including a first lens 410 and a second lens 420, third lenses 500A–500D, a mirror unit 600, a horizontal synchronizing signal detection unit 700, and the like are mounted on the upper surface 10A of the bottom plate 10. In FIG. 1, an XYZ coordinate system is indicated. In the XYZ coordinate system, X-axis is parallel with the optical axis of the lenses 410, 420 and 500, X-axis is parallel to the upper surface 10A and perpendicular to the Y-axis, and Z-axis is perpendicular to X-axis and Y-axis.

As shown in FIG. 2, the bottom plate 10 extends horizontally (i.e., parallel to an X-Y plane) when the scanning optical system is in use, and four photoconductive drums 20A–20D are arranged in X-axis direction at a predetermined interval with respect to each other, with a predetermined clearance provided with respect to the lower surface 10B of the bottom plate 10. The rotation axes of the photoconductive drums 20A–20D extend in Y-axis direction, and are parallel to each other.

The four photoconductive drums 20A–20D are provided for forming images of yellow, magenta, cyan and black components, respectively. That is, the latent images formed on the photoconductive drums 20A–20D are developed with yellow, magenta, cyan and black toner, and then the developed images are transferred onto a recording sheet in an overlapped manner.

The multi-beam scanning optical system 1000 operates as described below.

Four laser beams L emitted from the light source unit 100 pass through a cylindrical lens 230 and directed to the polygonal mirror unit 300. The beams LA–LD are deflected by the polygonal mirror unit 300 to scan within a predetermined angular range in the main scanning direction, which is Y-axis direction.

The scanning laser beams LA–LD pass through the composite lens unit 400, mirror unit 600 and the third lenses 500A–500D. Then, the four laser beams LA–LD passed through the third lenses 500A–500D are incident on the photoconductive drums 20A–20D, respectively. Thus, the beam spots formed by the four laser beams LA–LD scan on the photoconductive drums 20A–20D, respectively.

During scanning, the laser beams LA–LD deflected by the polygonal mirror unit 300 are incident on a light receiving sensor 720 of the horizontal synchronizing signal generating unit 700. Based on the output of the light receiving sensor 720, a timing of image formation on the photoconductive drums 20A–20D in the main scanning direction (i.e., Y-axis direction) is adjusted.

It should be noted that the main scanning direction is a direction parallel to the rotation axes of the photoconductive drums 20A–20D (i.e., Y-axis direction), and an auxiliary scanning direction is defined as a direction perpendicular to the main scanning direction (which is parallel to the X-axis direction).

Hereinafter, a structure of each unit will be described in detail.

As shown in FIG. 1, the light source unit 100 includes a housing 110, four laser diodes 120A–120D, four collimating lenses and a laser driving circuit.

The light source unit 100 is constructed such that the laser beams LA–LD emitted by the laser diodes 120A–120D and collimated by the collimating lenses are aligned when viewed from Z-axis direction, and spaced from each other in the Z-axis direction by a predetermined amount. As shown in FIG. 2, the beams LA–LD are arranged in this order from the bottom plate side.

As shown in FIG. 1, the cylindrical lens unit 200 includes a base 210 secured on the upper surface 10A of the bottom plate 10, a lens holder 220 protruded upward (i.e., in the Z-axis direction) from the base 210, and a cylindrical lens 230 held by the lens holder 220.

The cylindrical lens 230 has a light receiving surface 230A, on which the laser beams LA–LD emitted from the light source unit 100 are incident, and a light emerging surface 230B, from which the light beams LA–LD emerge.

The cylindrical lens 230 receives the collimated laser beams LA–LD emitted by the light source unit 100, and converge the same only in the Z-axis direction, which corresponds to the auxiliary scanning direction on the photoconductive drums 20A–20D.

The focal point of the cylindrical lens 230 is located substantially at the reflection surface 322 of the polygonal mirror 320, and accordingly, at the reflection surface 322, a line-shaped image extending in a direction corresponding to the main scanning direction on the photoconductive drums 20A–20D is formed.

The polygonal mirror unit 300 includes a motor unit 310 secured on the upper surface 10A of the bottom plate 10, and a polygonal mirror 320 secured to a spindle shaft of the motor unit 310, which extend in Z-axis direction.

The polygonal mirror 320 is formed to be equihexagonal viewed from Z-axis direction, whose side surfaces are formed as the reflection surfaces 322. It should be noted that the reflection surfaces 322 are perpendicular to the horizontal plane (i.e., the X-Y plane).

Each of the reflection surfaces 322 a single planar surface, onto which the four light beams emitted from the light source unit 100 and passed through the cylindrical lens 23 are incident simultaneously.

The motor 310 is controlled by a not-shown driving circuit to rotate counterclockwise in FIG. 1 at a predetermined speed. As the polygonal mirror 310 rotates, the laser beams LA–LD scan from right-hand side to left-hand side in FIG. 1.

The composite lens unit 400 includes the first lens 410 and the second lens 420, each of which consists of a single lens element. The first lens 410, the second lens 420 and the third lens 500 form an fθ lens system. The fθ lens system converges each of the four laser beams LA–LD on the respective photoconductive drums 20A–20D.

Specifically, the four laser beams LA–LD deflected by the polygonal mirror 320 are incident on the composite lens unit 400, which is secured on the upper surface 10A of the bottom plate 10 via a not-shown lens holder.

FIRST EMBODIMENT

FIG. 3A is a plan view of the composite lens unit 400 according to a first embodiment, FIG. 3B is a front view, viewed along arrow IIIB in FIG. 3A, and FIG. 3C is a side view, viewed along arrow IIIC in FIG. 3B.

The composite lens unit 400 is formed such that the first lens 410 and the second lens 420 are integrally formed. The beams LA–LD pass the first and second lenses 410 and 420, in this order. The first lens 410 has a power to converge the beams LA–LD mainly in Y-axis direction (i.e., the main scanning direction), and the second lens 420 mainly has a power to converge the beams LA–LD in Z-axis direction (which corresponds to the auxiliary scanning direction on the photoconductive drums 20A–20D). Thus, the composite lens unit 400 converges the laser beams LA–LD both in the Y-axis and Z-axis directions.

It should be noted that the main scanning direction is a direction in which the beams scan, and the auxiliary scanning direction is defined in relation to the main scanning direction. That is, at the photoconductive drums 20A–20D, the auxiliary scanning direction is the X-axis direction, while at the composite lens unit 400, the auxiliary scanning direction is the Z-axis direction, the main scanning direction being the Y-axis direction.

The composite lens unit 400 will be described further.

The first lens 410 has a light receiving surface 412 and a light emerging surface 414. The second lens 420 has a light receiving surface 422 and a light emerging surface 424. The light receiving surface 412 of the first lens 410 serves as a light receiving surface of the composite lens unit 400, and faces the reflection surface 322 of the polygonal mirror 320. The light emerging surface 414 of the first lens 410 and the light receiving surface 422 of the second lens 420 are cemented to each other. The light emerging surface 424 of the second lens 420 serves as a light emerging surface of the composite lens unit 400, and faces the mirror unit 600.

The first lens 410 converges the laser beams LA–LD mainly in the Y-axis direction (i.e., the main scanning direction).

The second lens 420 has convex surfaces 424A–424D for converging the beams LA–LD in the Z-axis direction (i.e., the auxiliary scanning direction), respectively, on the light emerging surface 424 (see FIG. 3C). At any cross section taken along a plane including the principal rays of the beams LA–LD and perpendicular to the X-Y plane, of the composite lens unit 400, the principal rays of the beams LA–LD coincide with the optical axes defined by the curvatures of the convex surfaces 424A–424D, respectively.

The laser beams LA–LD converged in the Y-axis direction are emerged from the light emerging surface 414, incident on the light receiving surface 422 of the second lens, and emerged from the convex surfaces 424A–424D with converged in the Z-axis direction.

As above, the laser beams LA–LD are incident on the light receiving surface 412 with being aligned in the Z-axis direction at a predetermined interval, and emerged from the light emerging surface 424 of the second lens 420 with being aligned in the Z-axis direction at the predetermined interval. The laser beams LA–LD are converged both in Y-axis direction and in Z-axis direction by the composite lens unit 400.

The composite lens unit 400 is constituted such that the first lens 410 and the second lens 420 are formed of different materials, and one of the first and second lenses 410 and 420 is formed integrally with the other using a mold.

If the first lens 410 is formed of synthetic resin and the second lens 420 is formed of glass, the composite lens unit 400 can be formed as a lens having a hybrid structure, i.e., lenses made from different materials (i.e., synthetic resin lens and glass lens) are integrally formed. Further, since the first lens 410 and the second lens 420 are integrally formed, the number of elements constituting the fθ lens can be reduced.

The mirror unit 600 is constructed to direct the four laser beams LA–LD emerged from the second lens 420 to the third lenses 500A–500D, respectively.

Specifically, the mirror unit 600 has first to fourth mirror groups 610, 620, 630 and 640.

The first mirror group 610 includes a mirror 612 that directs the laser beam LA emitted by the laser diode 120A to the photoconductive drum 500A;

the second mirror group 620 includes mirrors 622 and 624 that direct the laser beam LB emitted by the laser diode 120B to the photoconductive drum 500B;

the third mirror group 630 includes mirrors 632, 634 and 636 that direct the laser beam LC emitted by the laser diode 120C to the photoconductive drum 500C: and the fourth mirror group 640 includes mirrors 642, 644 and 646 that direct the laser beam LD emitted by the laser diode 120D to the photoconductive drum 500D.

The mirrors 612, 622, 624, 632, 634, 636, 642, 644 and 646 are formed to be elongated in the main scanning direction, and secured on the upper surface 10A of the bottom plate 10 using holding members (not shown).

The third lenses 500A–500D are secured on the upper surface 10A of the bottom plate 10 by holders 510A–510D, respectively. Each of the third lenses 500A–500D has a power mainly for converging the incident beam in the auxiliary scanning direction (i.e., the X-axis direction). The third lenses 500A–500D also have power in the main scanning direction (i.e., the Y-axis direction), the power in the main scanning direction being less than the power in the auxiliary scanning direction.

On the bottom plate 10, below each of the holders 510A–510D, openings 12A–12D extending in the main scanning direction are formed, and below which the photoconductive drums 20A–20D are arranged, respectively.

Thus, the third lenses 500A–500D, each of which extends in the Y-axis direction, are located at portions corresponding to the beams LA–LD, respectively.

The third lenses 500A–500D have light receiving surfaces 500A1–500D1 and light emerging surface 500A2–500D2, respectively.

The positional relationship between the first through fourth mirror groups 610, 620, 630 and 640 with respect to the third lenses 600A–600D will be described.

The mirror 612 of the first mirror group 610 reflects the laser beam emerged from the second lens 420 downward, at 90 degrees when viewed along Y-axis direction, to direct the beam toward the light receiving surface 500A1 of the lens 500A at a right angle when viewed along Y-axis direction.

The mirror 622 of the second mirror group 620 reflects the laser beam emerged from the second lens 420 upward, by substantially 45 degrees when viewed along Y-axis direction, to direct the beam toward the mirror 624. The mirror 624 reflects the incident beam downward, by substantially 45 degrees when viewed along Y-axis direction, so that the beam is incident on the light receiving surface 500B1 of the lens 500B at a substantially right angle when viewed along Y-axis direction.

The mirror 632 of the third mirror group 630 reflects the laser beam emerged from the second lens 420 obliquely downward to direct the beam toward the mirror 634. The mirror 634 reflects the incident beam obliquely upward to direct the beam to the mirror 636. The mirror 636 reflects the incident beam vertically downward so that the beam is incident on the light receiving surface 500C1 of the lens 500C at a substantially right angle when viewed along Y-axis direction.

The mirror 642 of the fourth mirror group 640 reflects the laser beam emerged from the second lens 420 upward, at 90 degrees when viewed along Y-axis direction, to direct the beam toward the mirror 644. The mirror 644 reflects the incident beam horizontally to direct the beam to the mirror 646. The mirror 646 reflects the incident beam vertically downward when viewed along Y-axis direction so that the beam is incident on the light receiving surface 500D1 of the lens 500D at a substantially right angle when viewed along Y-axis direction.

In the embodiment, the first lens 410 is used for converging the light beams LA–LD mainly in the main scanning direction, and the second and third lenses 420 and 500 are used for converging the light beam mainly in the auxiliary scanning direction.

With the above-described configuration, the line-shaped image formed at the reflection surfaces 322 of the polygonal mirror 320 is reflected thereby, passed through the first, second and third lenses and converged thereby, and thus, a beam spot is formed on each photoconductive drum.

The horizontal synchronizing signal detection unit 700 includes a single mirror 710, a single light receiving sensor 720, and a control circuit. It should be noted that only a signal unit 700 is provided for the four light beams LA–LD, which will be explained later.

The mirror 710 is provided at an upstream position, along the main scanning direction, out of an area contributing to image formation. The mirror 710 is secured on the upper surface 10A of the bottom plate 10 via a securing member 712 such that the beams LA–LD are reflected by the mirror 710 and incident on the light receiving sensor 720.

The light receiving sensor 720 is secured on the upper surface 10A by a securing member 722 so as to receive the light beams LA–LD reflected by the mirror 710.

A control circuit (not shown) drives the laser diodes 120A–120D in accordance with the light receiving signal output by the light receiving sensor 720, thereby an image formation starting timing, at which the image formation for each line starts, are synchronized. Specifically, the control circuit controls a laser diode driving circuit in the light source unit 100, thereby the laser diodes 120A–120D are driven.

According to the first embodiment, the composite lens unit 400 is formed as integrally formed first lens 410 that converges the laser beams LA–LD in the Y-axis direction (i.e., the main scanning direction) and the second lens 420 that converges the laser beams LA–LD in the Z-axis direction (i.e., the auxiliary scanning direction).

Since the first and second lenses 410 and 420 are integrally formed, the space occupied thereby can be reduced in comparison with a case where the first and second lenses 410 and 420 are formed as separate lenses. Accordingly, the flexibility in designing the optical paths can be retained, and the number of elements is reduced, which contributes to lowering of the manufacturing cost.

In the first embodiment, the composite lens unit 400 includes the first lens 410, which converges the beams in the Y-axis direction, and the second lens 420, which converges the beams in the Z-axis direction. The laser beams LA–LD pass through the first and second lenses 410 and 420 in this order. However, the invention is not limited to this configuration. The composite lens unit 400 may be constructed to have a first lens which converges the beams in the Z-axis direction (i.e., the auxiliary scanning direction), and a second lens which converges the beams in the Y-axis direction (i.e., the main scanning direction), and the beams pass the first and second lenses in this order. In this case, the convex surfaces formed on the firs lens are to face the polygonal mirror 320.

In the scanning device 1000 according to the invention, if the wavelengths of the beams LA–LD are not the same, scanning position of the beam spots on the photoconductive drums 20A–20D, in the main scanning position, become different.

The laser diodes 120A–120D emits the laser beams LA–LD, respectively. When a laser diode is driven to emit a laser beam, heat is generated and the temperature thereof increases. When the temperature increases, the wavelength of the emitted beam increases, and when the temperature decreases, the wavelength of the emitted beam also decreases.

Therefore, if the laser diodes 120A–120D are driven at different timings, the temperature of the laser diodes 120A–120D become different from each other. As a result, the wavelengths of the laser beams LA–LD become different from each other.

Since the fθ lens (i.e., the first lens 410, the second lens 420 and the third lens 500) are designed to have a certain characteristics for a predetermined designed wavelength. Therefore, if the wavelengths of the laser beams LA–LD are the same, the optical performance of the fθ lens for each laser beam is identical. However, if the wavelengths of the laser beams LA–LD are different, the optical performance becomes different for each laser beam, due to the lateral chromatic aberration.

When the scanning optical system 1000 is employed in a color printer, if the above-described problem occurs, the there occurs displacement between each color component image due to the lateral chromatic aberration, and there occurs color shift in the finally formed color image.

In the following embodiment, the scanning optical system is configured to compensate for the lateral chromatic aberration.

SECOND EMBODIMENT

Figure 4A:
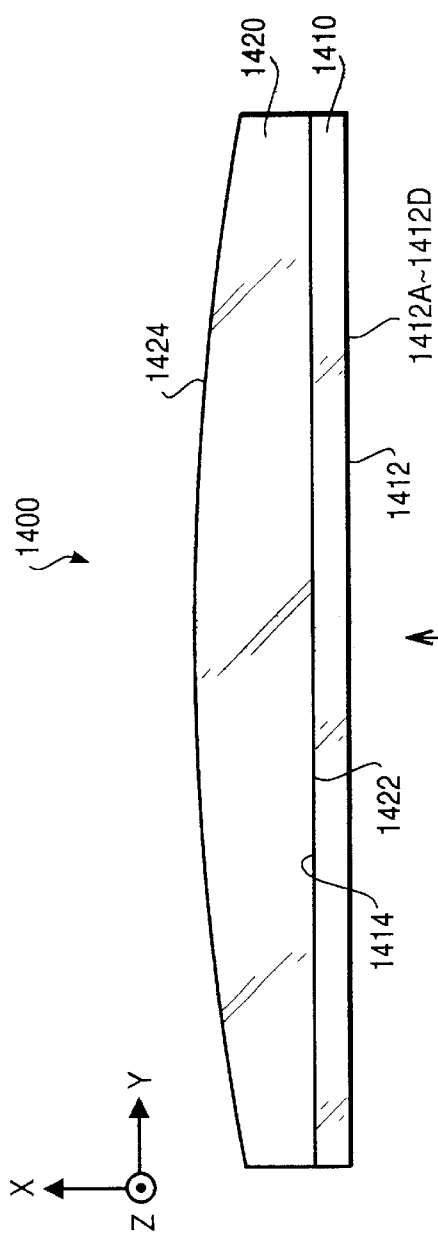
FIG. 4A is a plan view of a composite lens unit according to a second embodiment.
Figure 4B:
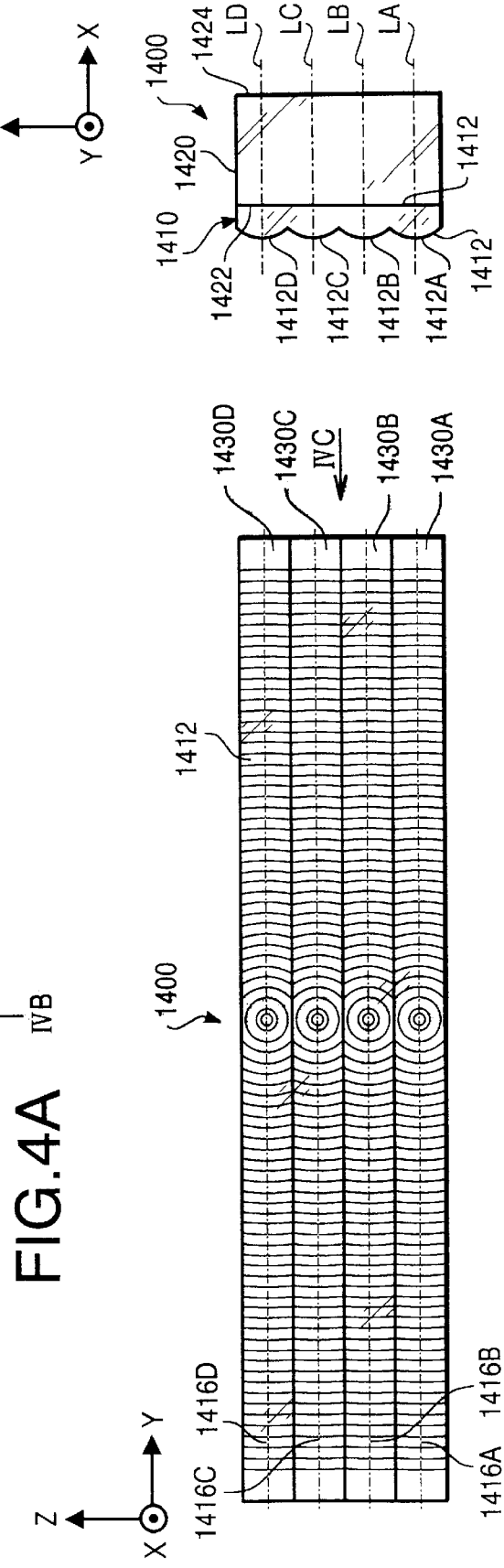
FIG. 4B is a front view of the composite lens unit, viewed along arrow IVB in FIG. 4A.
Figure 4C:
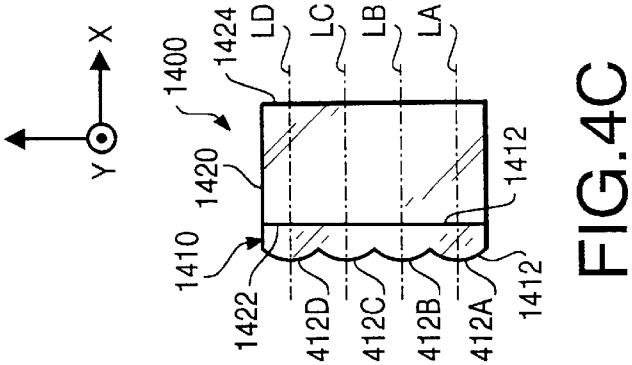
FIG. 4C is a side view of the composite lens unit, viewed along arrow IVC in FIG. 4B.

FIGS. 4A–4C show a composite lens unit 1400, which replaces the composite lens unit 400 shown in FIG. 1, according to a second embodiment of the invention. FIG. 4A is a plan view of the composite lens unit 1400, FIG. 4B is a front view thereof, viewed along arrow IVB in FIG. 4A, and FIG. 4C is a side view thereof, viewed along arrow IVC in FIG. 4B.

The composite lens unit 1400 consists of the first lens 1410 and the second lens 1420, which form, together with the third lens 500, an fθ lens of the second embodiment.

Similarly to the first embodiment, the fθ lens converges the laser beams LA–LD on the photoconductive drums 20A–20D, respectively.

As shown in FIGS. 4A–4C, the composite lens unit 1400 is constructed by integrally forming the first lens 1410 and the second lens 1420. The laser beams LA–LD pass through the first and second lenses 1410 and 1420 in this order.

The first lens 1410 has a power to converge the beams LA–LD mainly in Z-axis direction (i.e., the auxiliary scanning direction), and the second lens 1420 has a power to converge the beams LA–LD mainly in Y-axis direction (i.e., the main scanning direction). Thus, the composite lens unit 1400 converges the laser beams LA–LD both in the Y-axis and Z-axis directions.

The composite lens unit 1400 will be described further.

The first lens 1410 has a light receiving surface 1412 and a light emerging surface 1414. The second lens 1420 has a light receiving surface 1422 and a light emerging surface 1424. The light receiving surface 1412 of the first lens 1410 serves as a light receiving surface of the composite lens unit 1400, and faces the reflection surface 322 of the polygonal mirror 320. The light emerging surface 1414 of the first lens 1410 and the light receiving surface 1422 of the second lens 1420 are adhered to each other. The light emerging surface 1424 of the second lens 1420 serves as a light emerging surface of the composite lens unit 1400, and faces the mirror unit 600.

The first lens 1410 has convex surfaces 1412A–1412D, which are formed on the light receiving surface 1412, for converging the beams LA–LD in the Z-axis direction, respectively (see FIG. 4C). At any cross section taken along a plane including the principal rays of the beams LA–LD and perpendicular to the X-Y plane, of the composite lens unit 1400, the principal rays of the beams LA–LD incident on the central line, extending in the main scanning direction, of the convex surfaces 1412A–1412D, respectively.

The second lens 1420 converges the laser beams LA–LD mainly in the Y-axis direction.

The laser beams LA–LD converged in the Z-axis direction are emerged from the light emerging surface 1414, incident on the light receiving surface 1422 of the second lens, and emerged from the light emerging surface 1424 with converged in the Y-axis direction. In this embodiment, the light emerging surface 1414 of the first lens 1410 and the light receiving surface 1422 of the second lens 1420 are formed as flat surfaces.

Further, the convex surfaces 1412A–1412D are formed with diffraction lens structures 1416A–1416D, respectively. Specifically, each of the diffraction lens structures 1416A–1416D is formed on a base curve, which is a rotationally symmetrical aspherical surface, for compensating for the lateral chromatic aberration caused by the refraction lens structure of the fθ lens.

The composite lens unit 1400 is constructed such that the first lens 1410 and the second lens 1420 are formed of different materials, and one of the first and second lenses 1410 and 1420 is formed using a mold.

If the first lens 1410 is formed of synthetic resin and the second lens 1420 is formed of glass, the composite lens unit 1400 can be formed as a lens having a hybrid structure. Further, since the first lens 1410 and the second lens 1420 are integrally formed, the number of elements forming the fθ lens can be reduced.

According to the configuration described above, the lateral chromatic aberration of the refractive lens structure of the fθ lens is compensated by the diffractive lens structure 1416A–1416D formed on the light receiving surface 1412 of the first lens 1410. Therefore, even if the wavelengths of the laser beams LA–LD are different from each other, the image forming areas on the photoconductive drums 20A–20D in the main scanning direction coincide with each other, and therefore, the color shift of the image can be avoided.

In the second embodiment, the composite lens unit 1400 consists of the first lens 1410, which converges the beams in the Z-axis direction (i.e., the auxiliary scanning direction), and the second lens 1420 which converges the beams in the Y-axis direction (i.e., the main scanning direction). The laser beams LA–LD pass through the first and second lenses 1410 and 1420 in this order. However, the invention is not limited to this configuration. The composite lens unit 1400 may be constituted to have a first lens that converges the beams in the Y-axis direction, and a second lens that converges the beams in the Z-axis direction, and the beams pass the first and second lenses in this order. In this case, the convex surfaces formed on the second lens are to face the mirror unit 600. Such a configuration will be described as a third embodiment, referring to FIGS. 5A–5C.

THIRD EMBODIMENT

FIG. 5A is a plan view of a composite lens unit 2400 according to the third embodiment, FIG. 5B is a front view thereof, viewed along arrow VB in FIG. 5A, and FIG. 5C is a side view thereof, viewed along arrow VC in FIG. 5B. The composite lens unit 2400 replaces the composite lens unit 400 of the first embodiment.

The composite lens unit 2400 includes a first lens 2410 and a second lens 2420, which constitute, together with the third lens 500, an fθ lens of the third embodiment.

Similarly to the first embodiment, the fθ lens converges the laser beams LA–LD on the photoconductive drums 20A–20D, respectively.

As shown in FIGS. 5A–5C, the composite lens unit 2400 is constructed by integrally forming the first lens 2410 and the second lens 2420. The laser beams LA–LD pass through the first and second lenses 2410 and 2420 in this order.

The first lens 2410 mainly has a power to converge the beams LA–LD in Y-axis direction (i.e., the main scanning direction), and the second lens 2420 has a power to converge the beams LA–LD mainly in Z-axis direction (i.e., the auxiliary scanning direction). Thus, the composite lens unit 2400 converges the laser beams LA–LD both in the Y-axis and Z-axis directions.

The configuration of the composite lens unit 2400 will be described further.

The first lens 2410 has a light receiving surface 2412 and a light emerging surface 2414. The second lens 2420 has a light receiving surface 2422 and a light emerging surface 2424. The light receiving surface 2412 of the first lens 2410 serves as a light receiving surface of the composite lens unit 2400, and faces the reflection surface 322 of the polygonal mirror 320. The light emerging surface 2414 of the first lens 2410 and the light receiving surface 2422 of the second lens 2420 are cementing surfaces. The light emerging surface 2424 of the second lens 2420 serves as a light emerging surface of the composite lens unit 2400, and faces the mirror unit 600.

The second lens 2420 has convex surfaces 24122424A–2424D, which are formed on the light receiving surface 2422 of the second lens 2420, for converging the beams LA–LD in the Z-axis direction, respectively, (see FIG. 5C). At any cross section taken along a plane including the principal rays of the beams LA–LD and perpendicular to the X-Y plane, of the composite lens unit 2400, the principal rays of the beams LA–LD coincide with the optical axes defined by the curvatures of the convex surfaces 2424A–2424D, respectively.

The laser beams LA–LD converged in the Y-axis direction are emerged from the light emerging surface 2414, incident on the light receiving surface 2422 of the second lens, and emerged from the light emerging surface 2424 with converged in the Z-axis direction.

Further, the convex surfaces 2422A–2422D are formed with diffraction lens structures 2426A–2426D, respectively. Specifically, each of the diffraction lens structures 2426A–2426D is formed on a base curve (i.e., each of the convex surfaces 2422A–2422D), which is a rotationally symmetrical aspherical surface. The diffraction lens structures 2426A–2426D compensate for the lateral chromatic aberration caused by the refraction lens structure of the fθ lens.

The composite lens unit 2400 is constructed such that the first lens 2410 and the second lens 2420 are formed of different materials, and one of the first and second lenses 2410 and 2420 is formed using a mold.

If the first lens 2410 is formed of glass and the second lens 2420 is formed of synthetic resin, the composite lens unit 2400 can be formed as a lens having a hybrid structure. Further, since the first lens 2410 and the second lens 2420 are integrally formed, the number of elements forming the fθ lens can be reduced.

According to the configuration described above, the lateral chromatic aberration of the refractive lens structure of the fθ lens is compensated by the diffractive lens structure 2426A–2426D formed on the light emerging surface 2424 of the second lens 2420. Therefore, even if the wavelengths of the laser beams LA–LD are different from each other, the image forming areas on the photoconductive drums 20A–20D in the main scanning direction coincide with each other, and therefore, the color shift of the image can be avoided.

In the third embodiment, the composite lens unit 2400 consists of the first lens 2410, which converges the beams in the Y-axis direction, and the second lens 2420, which converges the beams in the Z-axis direction. The laser beams LA–LD pass through the first and second lenses 2410 and 2420 in this order. However, the invention is not limited to this configuration. The diffraction lens structure may be formed on the light receiving surface of the composite lens unit 2400 instead of the convex surfaces 2422A–2422C. Such an embodiment will be described as a fourth embodiment, referring to FIGS. 6A–6C.

FOURTH EMBODIMENT

Figure 6A:
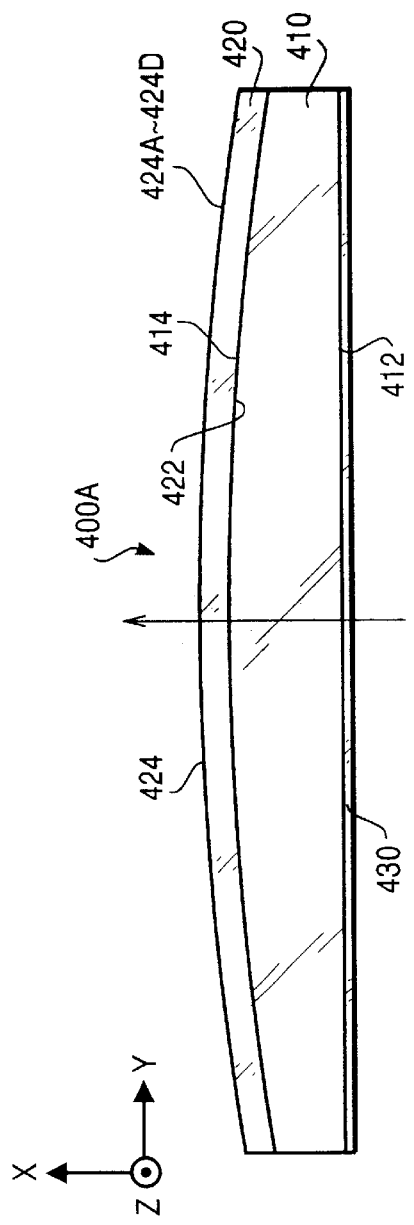
FIG. 6A is a plan view of a composite lens unit according to a fourth embodiment.
Figure 6B:
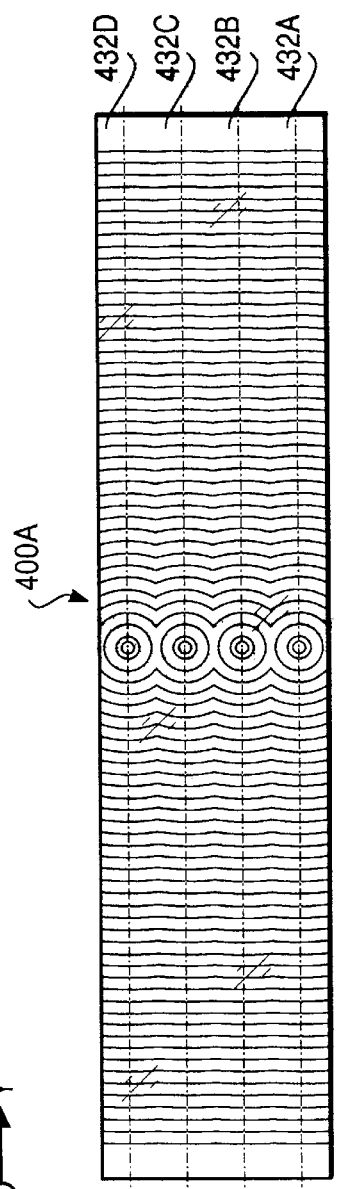
FIG. 6B is a front view of the composite lens unit, viewed along arrow VIB in FIG. 6A.
Figure 6C:
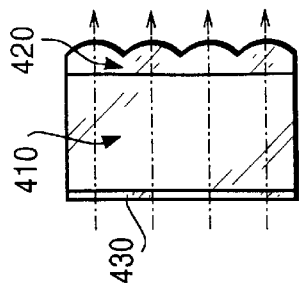
FIG. 6C is a side view of the composite lens unit, viewed along arrow VIC in FIG. 6B.

FIGS. 6A–6C show a construction of the composite lens unit 400A, according to the fourth embodiment. FIG. 6A is a plan view, FIG. 6B is a rear view of the composite lens unit 400A viewed along arrow VIB in FIG. 6A, and FIG. 6C is a side view of the second lens, viewed along arrow VIC in FIG. 7B. The structure of the composite lens unit 400A is similar to that of the composite lens unit 400 according to the first embodiment except that a compensation film 430 formed with diffraction lens structures 432A–432D are adhered on the light receiving surface 412 for compensating the lateral chromatic aberration caused by the refractive lens structure of the fθ lens. It is of course possible to form the diffraction lens structure 432A–432D integrally with the first lens 410 instead of using the film 430.

In the above embodiments, the scanning optical device 1000 includes four light sources corresponding to yellow, magenta, cyan and black color components. The invention is not limited to the scanning optical device using the four colors. The concept can be broadly applied for any scanning optical system utilizing multiple scanning beams.

Further, the configuration of the fθ lens is not limited to those described above. The invention can be applied to various types of fθ lenses, particularly in terms of power of each lens constituting the fθ lens. For example, the fθ lens may be constituted such that the third lens converges laser beams both in the main and auxiliary scanning directions.

The present disclosure relates to the subject matter contained in Japanese Patent Application No. HEI 11-310533, filed on Nov. 1, 1999, which is expressly incorporated herein by reference in its entirety.

What is claimed is:

1. A multi-beam scanning optical system, comprising:
   a light source unit emitting a plurality of beams, said plurality of beams being parallel to each other;
   a polygonal mirror having a plurality of reflection surfaces arranged along a rotational direction of said polygonal mirror, the plurality of beams emitted by said light source unit being incident on said polygonal mirror and reflected by the reflection surfaces of said polygonal mirror; and
   an fθ lens system, the plurality of beams reflected by the reflection surface of said polygonal mirror passing through said fθ lens system and proceeding toward surfaces to be scanned, wherein said fθ lens includes a first lens that converges the beams mainly in the main scanning direction, and a second lens that converges the beams mainly in the auxiliary scanning direction, and wherein said first and second lenses are made of different materials, one of said first and second lenses being formed integrally with the other using a mold such that said first and second lenses form a composite lens.

2. The multi-beam scanning optical system according to claim 1, wherein the beams reflected by said polygonal mirror are incident on said first and second lenses in this order, wherein said second lens is provided with convex surfaces, on a light emerging surface of said second lens, extending in the main scanning direction, said convex surfaces converging the beams in the auxiliary scanning direction, respectively.

3. The multi-beam scanning optical system according to claim 2, wherein diffraction lens structures are provided on a light receiving surface of said first lens.

4. The multi-beam scanning optical system according to claim 3, said diffraction lens structure being formed on a film adhered onto the light receiving surface of said first lens.

5. The multi-beam scanning optical system according to claim 2, wherein diffraction lens structures are provided on a light emerging surface of said second lens, said diffraction lens structures being formed on said convex surfaces, respectively.

6. The multi-beam scanning optical system according to claim 2, wherein diffraction lens structures are formed on the light receiving surface of said first lens at positions where the beams incident, respectively.

7. The multi-beam scanning optical system according to claim 2, wherein diffraction lens structures are formed on the light emerging surface of said second lens at positions where the beams passes, respectively.

8. A multi-beam scanning optical system, comprising:

a light source unit emitting a plurality of beams, said plurality of beams being parallel to each other;

a polygonal mirror having a plurality of reflection surfaces arranged along a rotational direction of said polygonal mirror, the plurality of beams emitted by said light source unit being incident on said polygonal mirror and reflected by the reflection surfaces of said polygonal mirror; and an fθ lens system, the plurality of beams reflected by the reflection surface of said polygonal mirror passing through said fθ lens system and proceeding toward surfaces to be scanned, wherein said fθ lens includes a first lens that converges the beams mainly in the auxiliary scanning direction, and a second lens that converges the beams mainly in the main scanning direction, and wherein said first and second lenses are made of different materials, one of said first and second lenses being formed integrally with the other using a mold such that said first and second lenses constitute a composite lens.

9. The multi-beam scanning optical system according to claim 8, wherein the beams reflected by said polygonal mirror are incident on said first and second lenses in this order, wherein said first lens is provided with convex surfaces, on a light receiving surface of said first lens, extending in the main scanning direction and converging the beams in the auxiliary scanning direction.

10. The multi-beam scanning optical system according to claim 9, wherein diffraction lens structures are formed on the light receiving surface of said first lens at positions where the beams incident, respectively.

11. The multi-beam scanning optical system according to claim 9, wherein diffraction lens structures are formed on the light emerging surface of said second lens at positions where the beams incident, respectively.

12. The multi-beam scanning optical system according to claim 9, wherein diffraction lens structures are provided on a light receiving surface of said first lens, said diffraction lens structures being formed on said convex surfaces, respectively.

13. The multi-beam scanning optical system according to claim 9, wherein diffraction lens structures are provided on a light emerging surface of said second lens.

14. The multi-beam scanning optical system according to claim 13, said diffraction lens structure being formed on a film adhered onto the light emerging surface of said second lens.

* * * * *